United States Patent [19]
Wirkner

[11] Patent Number: 4,724,941
[45] Date of Patent: Feb. 16, 1988

[54] MULTI-CAPACITY FRICTION DEVICE

[75] Inventor: Gilbert J. Wirkner, Howell, Mich.

[73] Assignee: General Motors Corporation, Detroit, Mich.

[21] Appl. No.: 945,026

[22] Filed: Dec. 22, 1986

[51] Int. Cl.⁴ .............................................. F16D 25/063
[52] U.S. Cl. .................................... 192/52; 192/85 AA; 192/109 F
[58] Field of Search ......... 192/109 F, 109 A, 85 AA, 192/70.2, 70.21, 70.27, 70.28, 52; 188/72.4, 72.6

[56] References Cited
U.S. PATENT DOCUMENTS

| | | | |
|---|---|---|---|
| 3,236,349 | 2/1966 | Wiggins et al. | 192/85 AA X |
| 4,040,339 | 8/1977 | Ivey | 192/85 AA X |
| 4,623,055 | 11/1986 | Ohkubo | 192/52 X |
| 4,664,242 | 5/1987 | Downs | 192/70.28 X |

*Primary Examiner*—Rodney H. Bonck
*Assistant Examiner*—David A. Testardi
*Attorney, Agent, or Firm*—Donald F. Scherer

[57] ABSTRACT

A selectively engageable friction torque transmitter has a housing in which is slidably disposed a piston to which housing is drivingly connected a plurality of friction discs or plates. The transmitter further includes a hub member to which are drivingly connected a plurality of second friction plates or disks interleaved with the aforementioned first plates. The first plate closest to the piston has a portion of the outer periphery thereof removed to permit fingers on the piston to bypass said plate and to be in close proximity with the next of the first plates. When the piston is initially moved axially to cause engagement of the friction transmitter, the first plate closest to the piston does not transmit torque while the remaining first plates and the associated second plates do transmit torque. An apply ring on the piston is placed in abutment with the first plate after initial engagement, to cause all of the interleaved plates to be frictionally engaged.

3 Claims, 2 Drawing Figures

MULTI-CAPACITY FRICTION DEVICE

BACKGROUND OF THE INVENTION

This invention relates to friction torque transmitting devices and more particularly to such devices having multiple discs and variable capacity.

Multiple disc friction torque transmitting devices providing variable capacity engagement are used to establish a smooth shift characteristic in power transmissions. These devices generally rely on a precise hydraulic pressure control to produce the desired engagement characteristic. Therefore, the smoothness of the shift or engagement of the friction device is subject to the temperature characteristics of the hydraulic fluid as well as fluid leakage that might occur in the hydraulic control circuit.

These problems have been addressed in the prior art by providing hydraulic timing circuits utilizing such devices as accumulators and one or more flow restrictors, or in some instances, a temperature compensating valve.

SUMMARY OF THE INVENTION

The present invention provides for a multi-capacity friction torque transmitter through the use of a flexible piston. The piston has axially extending fingers which are deployed to cause engagement of less than or all of the friction plates during initial engagement of the device. The fingers deflect as apply pressure increases to permit an apply ring disposed on the piston to cause engagement of the remaining plates whereby full engagement of the torque transmitter is attained.

In the preferred embodiment, the friction plate nearest the apply ring has portions of the outer circumference removed so that the fingers extend axially from the piston to abut a friction plate axially displaced from the piston to cause engagement of less than all of the friction plates in the torque transmitter.

An annular supporting rib for the fingers deflects to permit an apply ring formed on the piston to engage the friction plate closest thereto thus enforcing engagement of all the plates in the torque transmitting device.

It is therefore an object of this invention to provide an improved selectively engageable multidisc friction torque transmitter wherein a plurality of deflectable finger members cause engagement of less than all of the discs, and upon deflection of the finger members, an apply ring causes engagement of the remaining discs.

It is another object of this invention to provide an improved multidisc friction torque transmitting device wherein a pressure operated apply piston has a deflectable portion which abuts one disc to cause engagement of less than all of the discs upon initial pressurization of the apply piston and wherein further pressurization of the apply piston causes deflection of the deflectable portion to permit the apply piston to abut another disc to cause engagement of all the discs.

These and other objects and advantages of the invention will be more apparent from the following description and drawings.

Figure 1:
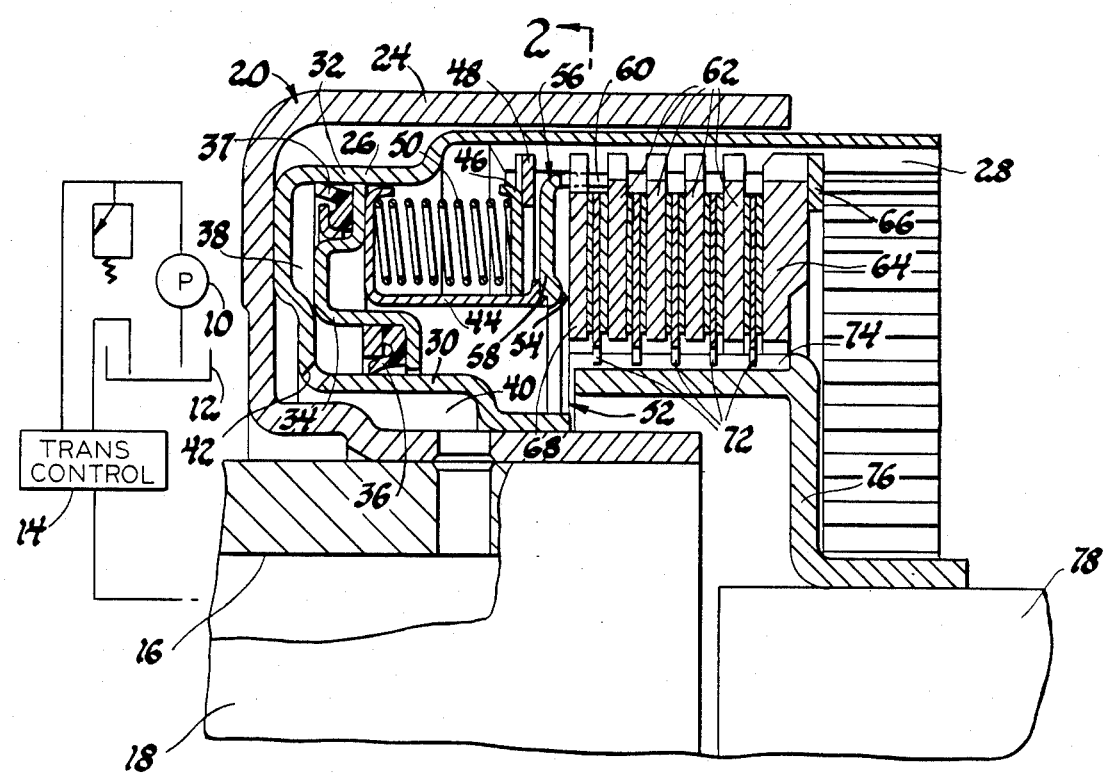
FIG. 1 is a schematic representation of a hydraulic control system and a cross-sectional elevational view of a friction torque transmitting device.

Referring to the drawings, there is seen in FIG. 1 a hydraulic pump 10 which draws fluid from a reservoir 12 and delivers the fluid to a power transmission control 14. Among other well-known functions, the transmission control is effective to distribute fluid to a passage 16 formed in a shaft member 18. The shaft member 18 has a multipiece housing 20 secured thereto. The housing 20 has an outer shell 24 and an inner shell 26. The inner shell 26 has formed thereon a plurality of spline teeth 28. The inner shell 26 also has a pair of annular walls 30 and 32 between which are slidably disposed an apply piston 34. The apply piston includes a pair of lip seals 36 and 37 which cooperate with the annular walls 30 and 32, respectively, to form an apply chamber 38.

The passage 16 is in fluid communication with a space 40 formed between the shells 24 and 26 and through a plurality of apertures 42 with the apply chamber 38. Whenever transmission control 14 distributes fluid pressure to passage 16, the apply chamber 38 will be pressurized. The fluid pressure in apply chamber 38 will urge the apply piston 34 to move rightwardly in an axial direction.

The apply piston 34 also has a spring retainer portion 44 which cooperates with a spring retainer ring 46 and a locking ring 48, secured to the inner shell 26, to form a space wherein a plurality of return springs, such as 50, are disposed. The rightmost edge of the spring retainer portion 44 has secured thereto an apply structure 52 which is comprised of an apply ring or surface 54 and a deflectable finger portion 56. The deflectable finger portion 56 includes a radially extending annular wall or rib 58 and a plurality of axially extending fingers 60. The fingers 60 extend parallel to and in close proximity with the inner diameter of spline teeth 28.

Figure 2:
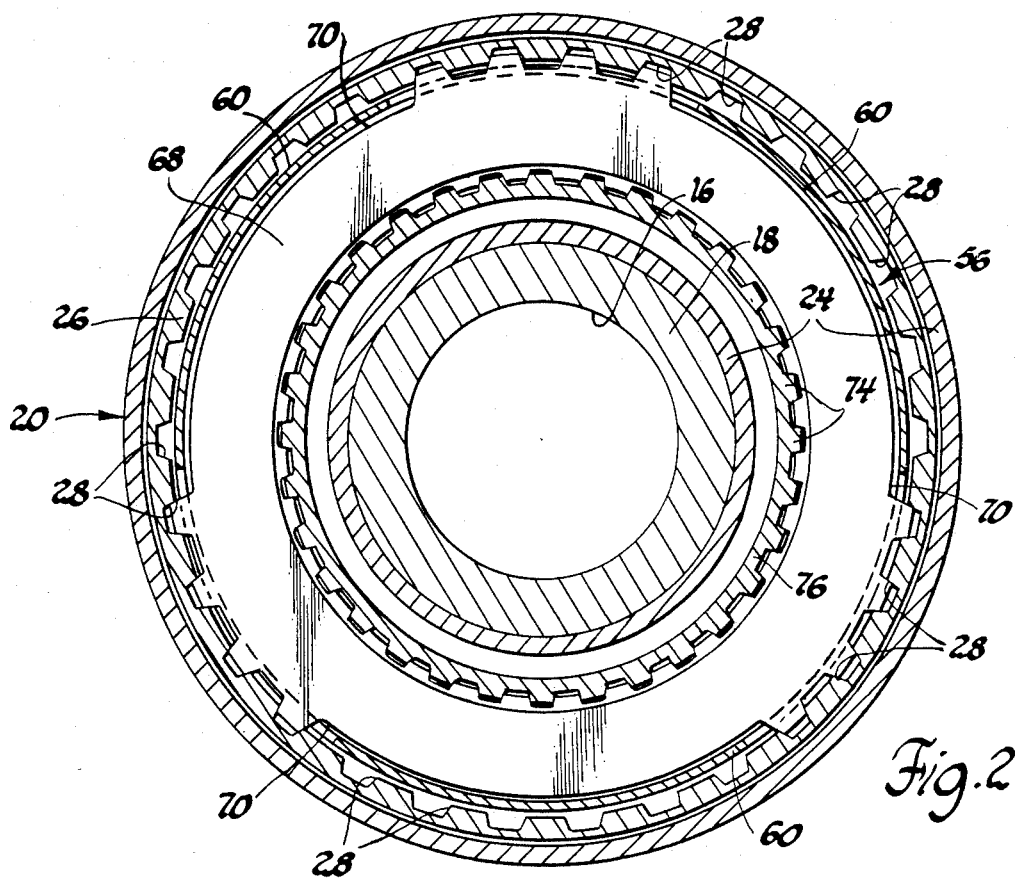
FIG. 2 is a view taken along line 2—2 of FIG. 1.

A plurality of friction discs or plates 62 are splined to the spline teeth 28 and therefore are drivingly connected to the housing 20. Also splined to the inner shell 26 of housing 20 is a backup plate 64 which is limited in rightward movement by a locking ring 66. Also splined to the inner shell 26 is a friction disc or plate 68 which, as best seen in FIG. 2, has a section of splines removed so as to form a plurality of circular segmented openings 70. The fingers 60 extend through these openings 70 and into close proximity with the leftmost friction plate 62.

Interleaved with the friction plates 62 and 68 is a plurality of friction discs or plates 72 which are splined at their inner diameter to a spline 74 formed on a hub 76. The hub 76 is secured to a shaft 78.

When fluid pressure is initially distributed to the apply chamber 38, the piston will begin moving rightward when the pressure is sufficient to overcome the force in the springs 50. This initial rightward movement of the piston 34 will cause the fingers 60 to enforce frictional engagement between the plates 62 and the respective interleaved plates 72. This frictional engagement will provide a torque transmitting relationship between housing 20 and hub 76, or on a broader spectrum, shaft 18 and shaft 78.

Since less than all of the friction discs are engaged, full capacity of the torque transmitting device will not be achieved on initial engagement. However, as the pressure in the apply chamber 38 continues to rise, the increased force on the piston 34, which is transmitted to the fingers 60, will cause deflection of the rib 58 such that the apply ring 54 will abut the friction plate 68 which will enforce frictional engagement of all of the interleaved plates and therefore full engagement of the torque transmitting device.

By engaging less than all of the friction plates, the engagement characteristic of the torque transmitting device permits smooth torque flow from the shaft 18 to the shaft 78 such that any powertrain gear elements connected thereto, will undergo a smooth ratio change or range shift.

In the preferred embodiment, the leftmost plate 68 is the only plate having a portion removed at the outer periphery. Should it be desirable to provide less initial engagement capacity, the same outer peripheral portion could be removed from one or more of the friction plates 62 beginning with the one closest to plate 68. Therefore, it is possible to have two, three or four friction plates originally providing engagement and the remainder of the plates being placed into frictional engagement with increased apply pressure.

At this point, it will be apparent to those skilled in the art that tailoring of the apply characteristic of the torque transmitting device can be quite easily accomplished with this torque transmitter. It will also be apparent that this engagement torque characteristic will be easily changeable between transmissions of a given family to accommodate various engine and transmission combinations.

The pump 10 and transmission control 14 are well-known in the transmission control art. As is known, these devices provide selective distribution of pressurized fluid to various torque transmitting devices, such as clutches and brakes, so that the changing of ratios and/or shifting between ranges can be accomplished automatically. Therefore, it should be apparent, that the present torque transmitting device is usable with many of these currently available transmission controls by replacing the clutch or brake of a known transmission with a clutch or brake having the physical properties of the above-described torque transmitter.

This invention also permits a clutch or brake to be more useful in transmissions where the torque transmitting device must support one torque level in a first drive ratio and a second torque level in a second drive ratio. To provide for two distinct levels of torque capacity, it is possible to pressurize the apply chamber at one pressure level for the first ratio and at another pressure level for the second ratio. Thus, engagement of less than all of the friction discs is attained at one pressure level and full engagement at the other pressure level. To provide for distinction between the apply levels it is possible to tailor the spring load of the springs 50 to have some inactive springs at the lowest apply level.

It is also possible to provide some viscous damping for the transmission during a ratio interchange. In some front wheel drive transmissions, the gear mass is decoupled from the engine during a ratio interchange. The drive axles act as springs in these transmissions and therefore provide stored energy which can support vibration of the gear mass. The inactive plates or friction discs provide viscous damping to significantly limit or eliminate the vibration.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A multi-capacity friction torque transmitting device comprising: a housing; an apply piston slidably disposed in said housing member and cooperting therewith to define a chamber; seal means disposed between said piston and said housing for preventing leakage from said chamber; a pluraity of first friction discs drivingly connected with said housing; a plurality of second friction discs interleaved adjacent to said first friction discs in an alternately spaced frictionally engageable manner; hub means drivingly connected to said second friction discs; said piston including a flexible apply ring having a plurality of fingers, and an apply surface; and means for selectively pressurizing said chamber for causing said piston to move axially in said housing for engaging said first friction discs with adjuacent second friction discs, said fingers causing less than all of said first friction discs to frictionally engage said adjacent second friction discs during initial movement of said piston and said apply ring causing all of said first friction discs to frictionally engage with said adjacent second friction discs upon further movement of said piston.

2. A multi-capacity friction torque transmitting device comprising: a housing; an apply piston slidably disposed in said housing member and cooperating therewith to define a chamber; seal means disposed between said piston and said housing for preventing leakage from said chamber; first friction disc means drivingly connected with said housing; second friction disc means disposed between said piston and said first friction disc means and being drivingly connected with said housing and having a portion of the periphery adjacent the housing removed; third friction disc means interleaved adjacent to said first friction disc means and said second friction disc means, respectively, in an alternately spaced frictionally engageable manner; hub means drivingly connected to said third friction disc means; said piston including an apply ring having deflectable apply means, and an apply surface, said deflectable apply means extending axially and bypassing said second friction disc means to abut a portion of said first friction disc means; and means for selectively pressurizing said chamber for causing said piston to move axially in said housing for urging said deflectable apply means to cause engagement of said first friction disc means with said interleaved third friction disc means wherein less than all of said first and second friction disc means frictionally engage said third friction disc means during initial movement of said piston and said apply surface moving into abutment with said second friction disc means during further movement of said piston causing all of said friction disc means to be frictionally engaged.

3. A multi-capacity friction torque transmitting device comprising: a housing; an apply piston slidably disposed in said housing member and cooperating therewith to define a chamber; seal means disposed between said piston and said housing for preventing leakage from said chamber; a plurality of first friction discs drivingly connected with said housing; a plurality of second friction discs interleaved adjacent to said first friction discs in an alternately spaced frictionally engageable manner; hub means drivingly connected to said second friction discs; said piston including a plurality of deflectable fingers, and an apply surface; viscous fluid being disposed between the discs in the disengaged condition and means for selectively pressurizing said chamber for causing said piston to move axially in said housing for engagng said first friction discs with adjacent second friction discs, said fingers causing less than all of said first friction discs to frictionally engage said adjacent second friction discs with one engagement pressure operating on said piston, said unengaged first and second friction discs cooperating to provide viscous damping within the torque transmitting device, and said apply surface causing all of said first friction discs to frictionally engage with said adjacent second friction discs with another engagement pressure operating on said piston.

* * * * *